United States Patent [19]

Tsuji et al.

[11] Patent Number: 5,496,573
[45] Date of Patent: Mar. 5, 1996

[54] COFFEE FILTER MATERIAL AND COFFEE FILTER BAG

[75] Inventors: Hiroshi Tsuji, Toyonaka; Hiromasa Saisaka, Izumiotsu; Hideo Murakami, Kyoto; Kaichi Suzuki, Kyoto; Masaaki Fukuchi, Kyoto, all of Japan

[73] Assignees: Yamanaka Industry Co., Ltd., Kyoto; Kuraray Co., Ltd., Okayama, both of Japan

[21] Appl. No.: 395,174

[22] Filed: Feb. 27, 1995

Related U.S. Application Data

[63] Continuation of Ser. No. 122,311, Sep. 14, 1993, abandoned, which is a continuation of Ser. No. 824,722, Jan. 17, 1992, abandoned, which is a continuation of Ser. No. 559,305, Jul. 30, 1990, abandoned.

[30] Foreign Application Priority Data

| Aug. 1, 1989 | [JP] | Japan | 1-198001 |
| Dec. 29, 1989 | [JP] | Japan | 1-340575 |
| May 2, 1990 | [JP] | Japan | 2-115191 |

[51] Int. Cl.$^6$ .................................................. B65D 85/00
[52] U.S. Cl. ........................ 426/84; 210/508; 426/112; 426/433
[58] Field of Search ................... 426/77, 84, 490, 426/495, 432, 433, 394, 82, 435, 112; 210/507, 508, 902, 908, 474, 473, 477, 481, 482, 471, 500.27, 799, 495, 479

[56] References Cited

U.S. PATENT DOCUMENTS

| 2,926,088 | 2/1960 | Spiselman | 426/433 |
| 3,003,643 | 10/1961 | Thomas | 210/508 |
| 3,511,666 | 5/1970 | Hudson et al. | 426/394 |
| 3,616,934 | 11/1971 | Ehrlich | 210/474 |
| 3,640,727 | 2/1972 | Heusinkveld | 426/394 |
| 4,229,481 | 10/1980 | Fornari | 426/394 |
| 4,784,892 | 11/1988 | Storey et al. | 210/507 |
| 4,795,559 | 1/1989 | Shinjou et al. | 210/500.27 |
| 4,859,348 | 8/1989 | Jusaitis et al. | 210/497.2 |
| 4,863,601 | 9/1989 | Wittekind et al. | 210/474 |

FOREIGN PATENT DOCUMENTS

| 0170461 | 2/1986 | European Pat. Off. . |
| 1473574 | 11/1967 | France . |
| 2128945 | 10/1972 | France | 210/477 |
| 2121762 | 1/1984 | United Kingdom . |

OTHER PUBLICATIONS

Chemical Engineers' Handbook Ed. J. Perry, 1973, McGraw-Hill, Inc. Section 19, pp. 62 and 63.
Sivetz et al. Coffee Technology, 1979, AVI Publishing Co., Inc. pp. 689–692.

*Primary Examiner*—Anthony J. Weier
*Attorney, Agent, or Firm*—Michael N. Meller

[57] ABSTRACT

A coffee filter material and bag suitable for providing a high-quality coffee extract, having a nonwoven fabric filter layer which is composed of thermoplastic organic synthetic fibers, satisfies the relationships (1) to (4):

$$3 \leq x \leq 30 \quad (1)$$

$$y \geq 0.2x \quad (2)$$

$$1 \leq r_{30} \quad (3)$$

and $$r_{70} \leq 50 \quad (4)$$

wherein x is a basis weight (g/m$^2$) of the woven fabric, y is a cumulative volume value (cm$^3$/g) of fine pores in the nonwoven fabric, $r_{30}$ is a maximum radius (μm) of the fine pores observed when the volumes of the fine pores are cumulated from the small pore radius side and the cumulative volume value becomes equal to 0.3y, and $r_{70}$ is a maximum radium (μm) of the fine pores observed when the volumes of the fine pores are cumulated from the small pore radius side and the cumulative volume value becomes equal to 0.7y, and is capable of absorbing in the wet state thereof at least 0.5 g/g of an oil and fat component from the coffee extract.

6 Claims, 5 Drawing Sheets

COFFEE FILTER MATERIAL AND COFFEE FILTER BAG

This application is a continuation of U.S. application Ser. No. 08/122,311, filed Sep. 14, 1993, now abandoned, which is a continuation of U.S. application Ser. No. 824,722, filed Jan. 17, 1992, now abandoned, which is a continuation of U.S. application Ser. No. 559,305 filed Jul. 30, 1990, now abandoned.

BACKGROUND OF THE INVENTION

1. Field of the Invention

The present invention relates to a coffee filter material and a coffee filter bag. More particularly, the present invention relates to a coffee filter material usable for a coffee filter bag or drip type coffee filter vessel for obtaining a high-quality coffee extract, and to a coffee filter bag formed by using this material.

2. Description of the Related Arts

Various coffee extraction methods, such as a siphon method using an extracting tool, an espresso method, a meliol method, and a drip method are known, and the drip method is currently most widely used.

The flannel drip extraction method is most generally adopted, wherein a 40-count flannel formed by raising a thick woven cotton fabric is used for a filter bag for separating a coffee extract from coffee powder during a filtration extraction of coffee. This filter cloth, however, is thick, and if used over a long period, clogging occurs and coffee fat is adhered to the filter cloth, with the result that the filter cloth is contaminated, discolored, and impregnated with a smell. Accordingly, after the filter cloth is used, it must be washed with water, and should be immersed in water before using it again, and thus, for reasons of sanitation, great care is necessary. Accordingly, the flannel drip type extraction method is limited with regard to business use or for use by specific persons.

Furthermore, the paper drip type extraction method is defective in that, since a thick filter paper is generally used, a long time is required for the filtration and extraction. Although the paper drip extraction method is used for a small number of persons, if the amount of coffee powder is small, the filtration area is small, and thus hot water must be frequently and uniformly poured thereover, for an extraction of all of the coffee, and the required quantities of hot water must be measured in advance. Namely, many preliminary operations must be conducted before the extraction operation, and the extraction loss and extraction unevenness are conspicuous, and further, the temperature of the hot water is lowered during the extraction operation and thus it is necessary to reheat the water.

As pointed out above, a paper filter sheet or a nonwoven fabric filter sheet is generally used as the filter material for the extraction of coffee, and some of these conventional filter sheet materials for the extraction of coffee are not satisfactory because the effect of filtering and removing coffee particles (solids) is excessively high, the concentration or flavor of the obtained coffee extract is insufficient, and a long time is required for the extraction. Other conventional sheet materials are disadvantageous in that, since the effect of filtering and removing coffee particles is excessively low, the obtained coffee extract contains large-quantities of solid coffee particles, and the flavor or taste is degraded and precipitates are formed.

If a fine powder of coffee is extracted with hot water, an oil and fat component in the fine powder of coffee is additionally extracted, and thus a filter sheet material for extraction of coffee is required to appropriately remove this oil and fat component by adsorption.

Before the present invention, however, the filtering characteristics that should be possessed by a coffee filter sheet material for obtaining a high-quality coffee extract from a fine powder of coffee were little known.

For example, Japanese Unexamined Utility Model Publication Nos. 55-129667, 55-129668 and 55-129669 disclose a coffee bag formed of a filter sheet in which the distribution density of filtering fine pores having a pore size of 80 μm or more is limited to 6 pores or less per cm$^2$. In this coffee bag, however, only a conventional nonwoven fabric capable of substantially inhibiting a permeation of relatively large particles having a particle size of 80 μm or more is used, and this coffee bag is still unsatisfactory as a filter material for fine particles of coffee. Moreover, with this coffee bag, to prevent a leakage of fine coffee particles, a preliminary treatment of separating and removing fine particles is necessary, and therefore, a utilization of components extracted from fine coffee particles is impossible. Still further, the extraction operation is complicated. Accordingly, this coffee bag is not completely satisfactory for obtaining a high-quality coffee extract.

SUMMARY OF THE INVENTION

An object of the present invention is to provide a coffee filter material capable of appropriately filtering coffee fine particles at the extraction of coffee and appropriately adsorbing and collecting an oil and fat extract component, and thus suitable for obtaining a high-quality coffee extract, and a coffee filter bag formed by using this filter material.

The above object can be attained by the coffee filter material of the present invention which is provided with a fibrous filter layer comprising a filter nonwoven fabric composed of thermoplastic organic synthetic fibers, wherein the filter nonwoven fabric satisfies the relationship (1) to (4):

$$3 \leq x \leq 30 \tag{1},$$

$$y \geq 0.2x \tag{2},$$

$$1 \leq r_{30} \tag{3},$$

and $$r_{70} \leq 50 \tag{4}$$

wherein x represents a basis weight (g/m$^2$) of the filter nonwoven fabric, y represents a cumulative volume value (cm$^3$/g) of fine pores in the filter nonwoven fabric, determined by a mercury porosimeter, $r_{30}$ represents a maximum radius (μm) of the fine pores observed when the volumes of the fine pores in the filter nonwoven fabric are cumulated from the small pore radius side and the cumulative volume value becomes equal to 0.3y, and $r_{70}$ represents a maximum radius (μm) of the fine pores observed when the volumes of the fine pores in the filter nonwoven fabric are cumulated from the small pore radius side and the cumulative volume value becomes equal to 0.7y, and is capable of adsorbing in the wet state thereof at least 0.5 g/g of an oil and fat component from the coffee extract.

In accordance with another aspect of the present invention, there is provided a coffee filter material comprising a composite sheet material which comprises a fibrous filter layer comprising a filter nonwoven fabric composed of thermoplastic organic synthetic fibers having an average diameter of 15 μm or less and a supporting layer comprising at least one sheet of a reinforcing fabric having no substantial influence on the filtering property of the fibrous filter layer, and laminated on and combined with the fibrous filter layer, and characterized in that the composite sheet material has an air permeability of 10 to 250 $cm^3/cm^2$.sec, and in the extraction of coffee, the coffee fine particles permeated through the composite sheet material have a volume average particle size within the range of from 5 to 10 μm determined from the particle size distribution of the permeated coffee fine particles having a size of 50 μm or less. Further, the bag-shaped member for coffee filter bag is made from the coffee filter material of the present invention.

Furthermore, the coffee filter bag in accordance with the present invention comprises a bag-shaped member formed of the coffee filter material mentioned above, a coffee powder contained in the bag-shaped member, and a hanging member fixed on at least one end portion thereof to the bag-shaped member.

DESCRIPTION OF THE PREFERRED EMBODIMENTS

Figure 1:
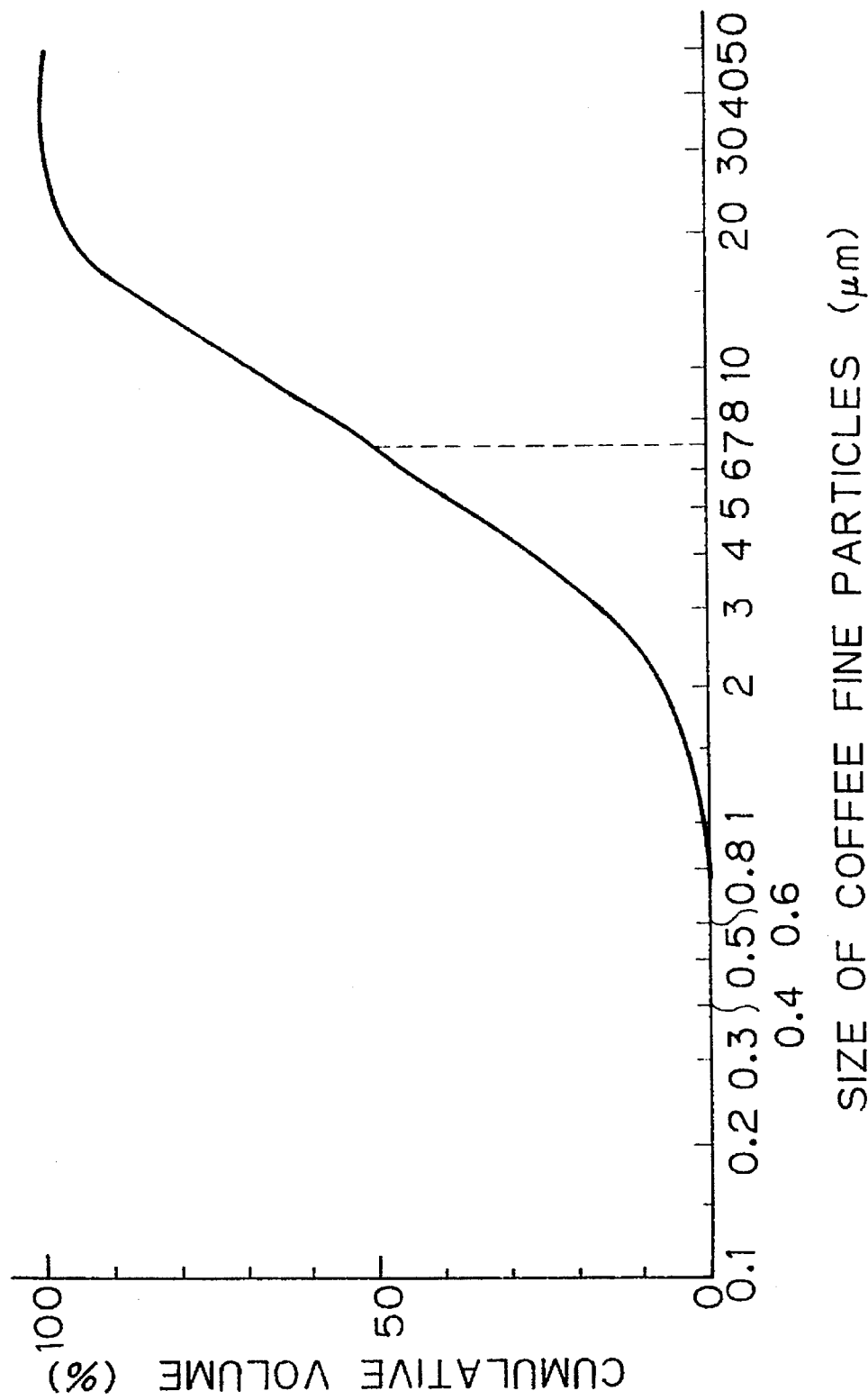
FIG. 1 is a graph illustrating the filtering performances of the coffee filter composite material of the present invention to coffee fine particles.

Generally, where coffee is extracted by using a filter material, if the volume average particle size of coffee fine particles which have permeated through the filter material and are contained in the coffee extract is 3 to 20 μm, preferably 5 to 10 μm, the obtained coffee extract has a high transparency, precipitates are not formed or little formed in the extract, and the coffee extract has a high grade and a good flavor. A filter material is required to enable a preparation of such a high-quality coffee extract in a short extraction time.

The coffee filter material of the present invention can satisfy this requirement, and is characterized in that a specific filter nonwoven fabric is used in the fibrous filter layer of the coffee filter material satisfies the requirements represented by the above-mentioned relationships (1) through (4) and is capable of adsorbing at least 0.5 g/g of an oil and fat component extracted from coffee.

The basis weight x of the filter nonwoven fabric satisfies the relationship of $3 \leq x \leq 30$. If this basis weight x is smaller than 3 $g/m^2$ the capacity of capturing fine particles is too low, and it is difficult to prepare the nonwoven fabric having such a small basis weight. If the basis weight x is larger than 30 $g/m^2$, the coffee extraction speed is extremely low.

In the filter nonwoven fabric of the present invention, the cumulative (total) volume value y of fine pores in the filter nonwoven fabric, measured by a mercury porosimeter, satisfies the relationship of $y \geq 0.2x$. If the value y is smaller than 0.2x, the coffee extraction speed of the obtained filter material is too low. Accordingly, if the value x is increased, this disadvantage of a reduction of the extraction speed occurs unless the value y is proportionally increased. In general, the relationship of $y \geq 0.2x$ (2) should be established between x and y, as pointed out above, but preferably the relationship of $y \geq 0.25x$, especially $y \geq 0.3x$, is satisfied.

The values (μm) of $r_{30}$ and $r_{70}$ should satisfy the relationships of $1 \leq r_{30}$ and $r_{70} \leq 50$, respectively If $r_{30}$ is smaller than 1 μm, the filtration speed of the filter material is too low, and if $r_{70}$ is larger than 50 μm, the particle size of the coffee fine particles permeated through the resultant filter material is too large, and the amount of such particles is too large, with the undesirable result that the coffee extract becomes turbid and the amount of precipitates is increased. It is generally preferred that the relationships $3 \leq r_{30}$ and $r_{70} \leq 40$, especially $5 \leq r_{30}$ and $r_{70} \leq 30$, are satisfied.

When the maximum fine pore radius (μm) observed when the volumes of the fine pores in the filter nonwoven fabric are cumulated from the small pore radius side, and the cumulative volume value becomes equal to 0.5y, is expressed as $r_{50}$, preferably, in the filter nonwoven fabric used in the present invention, the relationship of $3 \leq r_{50} \leq 40$, especially $5 \leq r_{50} \leq 30$, is established. Particularly preferably, the relationship of $7 \leq r_{50} \leq 20$ is satisfied.

As the diameter of the fiber constituting the nonwoven fabric increases, the fine pore radius distribution is biased to the large radius side, and as the fiber radius decreases, the fine pore radius distribution is biased to the small radius side. When the comparison is made based on the same fiber size, as the total pore volume increases, the fine pore radius distribution is biased to the large radius side.

In the filter nonwoven fabric usable for the present invention in the wet state thereof, the adsorption of the oil and fat component from the coffee extract must be at least 0.5 g/g on a dry fiber basis in the wet state. If the oil and fat component adsorption is smaller than 0.5 g/g, an oil film floats on the surface of the obtained coffee extract, and the quality and flavor of the coffee extract are poor. Preferably, the oil and fat component adsorption is at least 1 g/g, especially at least 2 g/g.

The oil and fat component adsorption of the filter nonwoven fabric depends on the type and size of the fiber constituting the filter nonwoven fabric. In general, the oil and fat component adsorption becomes smaller in order of a polypropylene fiber, a polyethylene fiber, a polyester fiber, a nylon fiber, and a cellulose fiber.

The filter nonwoven fabric used in the present invention is formed of a thermoplastic organic fiber, and preferably the average diameter of the organic synthetic fiber is 30 μm or less, more preferably 15 μm or less, most preferably 5 μm or less.

The filter nonwoven fabric can be prepared from the above-mentioned organic synthetic fibers according to any of the dry processes, the wet processes and the combination thereof. The filter nonwoven fabric has a uniform fiber distribution and a uniform density, and accordingly, the filter nonwoven fabric has uniform filtering characteristics.

If the fibrous filter layer is prepared from a sheet material other than a nonwoven fabric, such as a woven fabric or a knitted fabric, the distribution of the filtering pores becomes uneven. If the nonwoven fabric is formed from inorganic fibers, an effect of appropriately removing the oil and fat component contained in the coffee extract cannot be obtained.

If the organic synthetic fibers have an average diameter exceeding 30 µm, it is difficult to control the filtering characteristics of the resultant filter nonwoven fabric as satisfactorily as in the present invention, and the effect of removing the oil and fat component becomes insufficient.

The organic synthetic fibers used for the formation of the filter nonwoven fabric of the present invention can be either continuous filaments or short fibers.

Any of fiber-forming organic polymers such as polyolefins (for example, polyethylene and polypropylene), polyvinyl chloride, polyesters (for example, plyethylene terephthalate), polyamides (for example, nylon 6 and nylon 60) and acrylic polymers can be used as the polymer for the formation of the organic synthetic fiber. In general, if fibers composed of polypropylene or a polyester are used, the oil and fat component in the coffee extract can be appropriately adsorbed and removed by the resultant filter material. Therefore, fibers of this type is preferably used for the formation the filter nonwoven fabric for the fibrous filter layer of the present invention.

Any fibers prepared by the melt blow process, by removing a sea component from an islands-in-sea type conjugated fiber, by dividing a lamination type conjugated fibers by the extraction removing method or the splitting method, and by extracting or removing a matrix component from conjugated fibers obtained by mix-spinning a plurality of incompatible polymer components can be used as the thermoplastic organic synthetic fibers constituting the filter nonwoven fabric for the fibrous filter layer of the present invention. Moreover, a product obtained by fibrillating a slit tape can be used as the organic synthetic fibers, if the average diameter is 30 µm or less. In view of the uniformity of the distribution of the filtering fine pores, a nonwoven fabric prepared by the melt blow process is preferably used. The average diameter of the organic synthetic fibers can be determined by measuring the diameters of fibers having a length of at least about 5 mm by an electron microscope, and calculating the mean value of the measured values. A small amount of other fibers, for example, cellulose fibers can be allowed, as long as the filtering property is not substantially influenced.

In the coffee filter material of the present invention, a supporting layer comprising at least one sheet of a reinforcing fabric having no substantial influence on the filtering property of the fibrous filter layer can be laminated and combined with the fibrous filter layer to form an integrated composite sheet material.

The supporting layer is composed of at least one porous material selected from woven fabrics, knitted fabrics, mesh fabrics, net-like sheets, and nonwoven fabrics, and the supporting layer has many filtering pores coarser than those of the fibrous filter layer and gives a practically sufficient mechanical strength to the filter material of the present invention.

The type of the fibers constituting the supporting layer is not particularly critical, but the fibers are generally selected from natural fibers (for example, cotton), regenerated fibers (for example, rayon and cupra), semi-synthetic fibers (for example, acetate fibers), and synthetic fibers (for example, polyester, polyamide, polyolefin and polyacrylic fibers). The thickness of the individual fibers is not particularly critical. The fibers constituting the supporting layer can be either continuous filaments or short fibers.

It is generally preferred that the fibers in the supporting layer are not swollen with water and are partially fusion-bonded, so that the filtering pore size is not changed at the extraction of coffee.

It is also preferred that, when the coffee filter material is subjected to the extraction of coffee and the particle size distribution of fine particles of coffee which have permeated through this filter material and have a particle size 50 µm or less is measured and volumes of the coffee fine particles having respective particle sizes are cumulated in order from the small particle size side to the large particle size side, the maximum size of the coffee fine particles in the fraction on the small particle size side of the coffee fine particles which fraction occupies 50% of the total volume of the coffee particles, that is, the volume average size of the coffee fine particle determined from the particle size distribution of the coffee fine particles having a particle size of 50 µm or less, are within a range of from 5 to 10 µm.

If this volume average particle size is smaller than 5 µm, this coffee filter material has a very poor coffee particle permeability and a long time is required for the filtration, and thus the concentration of the obtained coffee extract is insufficient and a good flavor cannot be obtained. Where this volume average particle size is larger than 10 µm, the coffee particle permeability of this coffee filter material becomes too high and the concentration of the obtained coffee extract becomes too high, and thus a precipitation of the coffee particles occurs and the flavor is not satisfactory.

When the filter material of the present invention is used for the extraction of coffee and when with respect to fine particles which have permeated through this filter material and have a particle size of 50 µm or less, volumes of fine particles having respective particle sizes are measured by a particle size distribution-measuring machine, the volumes of the fine particles having the respective particle sizes are cumulated from the small particle size side to the large particle side and percent ratios of the cumulative values to the total volume of the fine particles which have permeated through the filter material are calculated, a graph, for example, as shown in FIG. 1 is obtained. In FIG. 1, when the cumulative value of the volumes in the fine particle fraction on the small particle size side among the coffee fine particles which have permeated through the filter material reaches 50%, the maximum particle size in this fine particle fraction is about 7 µm.

The coffee filter material of the present invention is characterized in that the filtration can be performed at an appropriate filtration speed, a precipitation of coffee particles does not occur in the obtained coffee extract, and the obtained coffee extract has an appropriate concentration and a good flavor.

Figure 2:
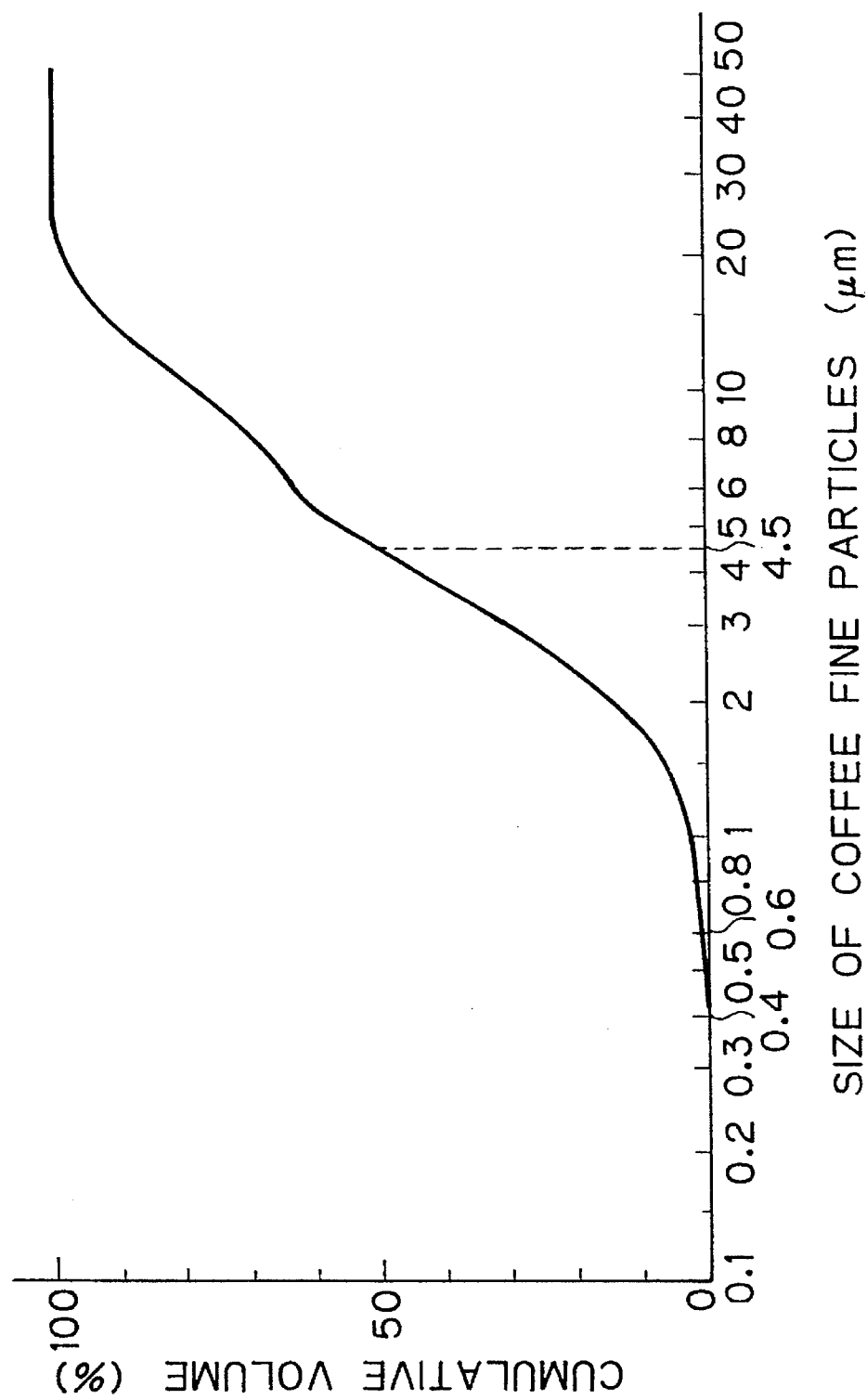
FIGS. 2 and 3 are graphs showing the filtering performances of conventional extraction filter materials to coffee fine particles.
Figure 3:
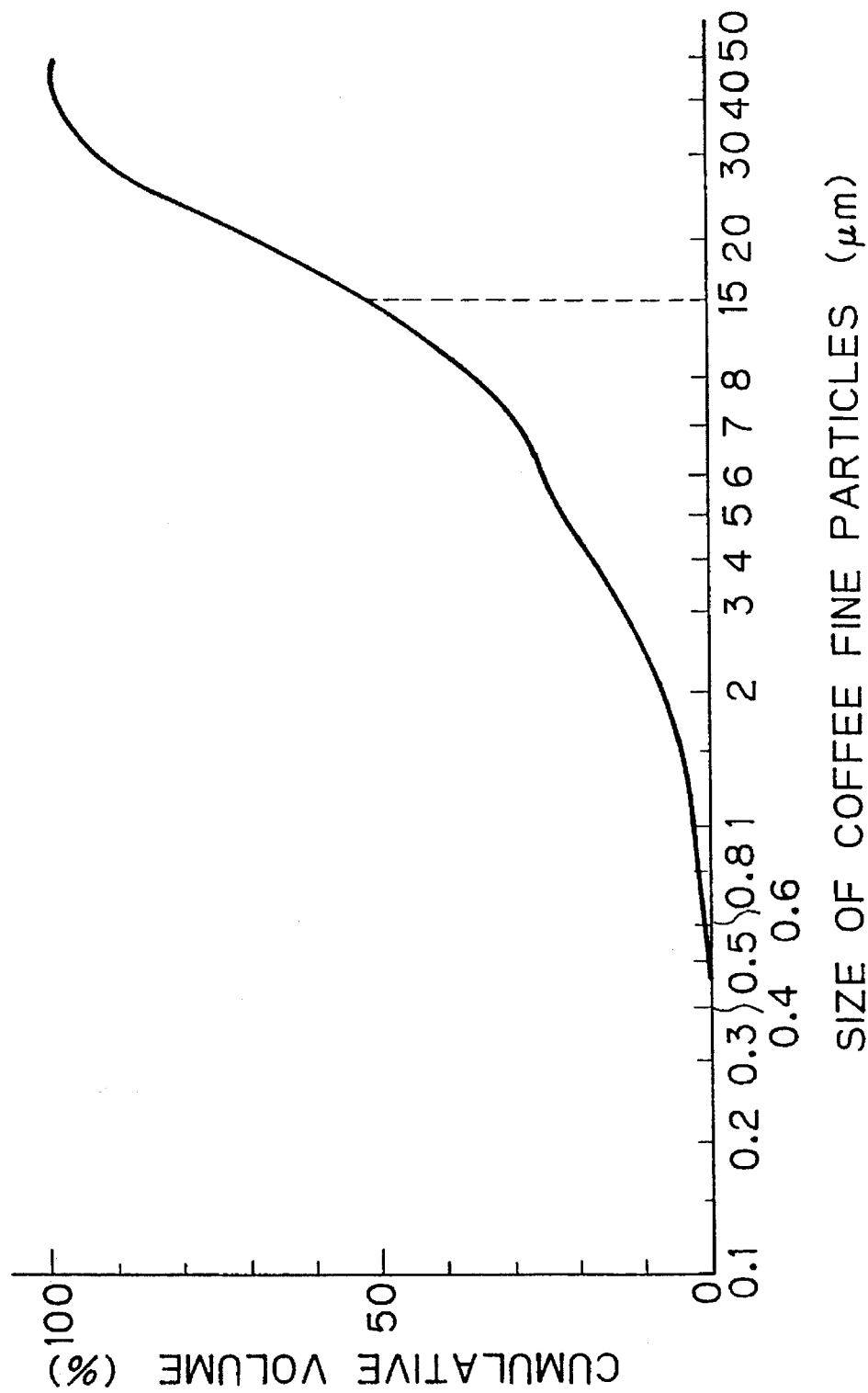

In contrast to the coffee filter material of the present invention having the filtering characteristics shown in FIG. 1, the conventional coffee filter materials show filtering characteristics as shown in FIGS. 2 and 3.

FIG. 2 illustrates an example of the relationship between the particle size of permeated coffee fine particles and the cumulative volume percentage of the permeating coffee fine particles, observed when the conventional drip coffee filter material is used for the extraction of coffee. In FIG. 2, the maximum particle size of fine particles in the fine particle fraction on the small particle size side, which occupies 50% of the total volume of the permeated coffee fine particles, is 4.5 μm. In this coffee filter material, since the filtering fine pores are too small, the taste of the obtained coffee extract is flat and a long time is required for the extraction.

FIG. 3 shows an example of the relationship between the particle size of permeated coffee fine particles and the cumulative volume percentage of the permeated coffee fine particles, observed when an ordinary nonwoven fabric filter material used for a ptisan extraction bag or the like is used for the extraction of coffee. In FIG. 3, the maximum particle size of fine particles in the fine particle fraction on the small particle size side, which occupies 50% of the total volume of the permeating coffee fine particles, is about 15 μm. Since this filter material has many filtering fine pores having an excessively large pore size, a precipitation of coffee particles exists in the obtained coffee extract and the flavor of the coffee extract is not satisfactory. Moreover, the adsorptive capture of the oil and fat component is insufficient, and sometimes, an oil and fat film is formed on the liquid surface.

Preferably, the coffee filter material of the present invention has an air permeability of 10 to 250 $cm^3/cm^2 \cdot sec$, more preferably 15 to 200 $cm^3/cm^2 \cdot sec$.

In general, a filter material for example, a filter bag, should have an appropriate liquid permeability (flux). If the liquid permeability is insufficient, a long time becomes necessary for the extraction of coffee, and the filter material is not practically useful. If the flux is too large, this means that the filter material has many filtering pores having too large a pore size, and too many fine particles permeate through the filter material.

If the extraction of coffee is carried out by using a coffee filter bag made of the coffee filter material of the present invention having an air permeability of 10 to 250 $cm^3/cm^2 \cdot sec$, fine powder of coffee is appropriately filtered.

If the air permeability of the filter material exceeds 250 $cm^3/cm^2 \cdot sec$, even coarse particles in fine powder of coffee permeate through the obtained filter bag. If the air permeability of the sheet material is lower than 10 $cm^3/cm^2 \cdot sec$, the permeation of fine powder of coffee is excessively restricted. To obtain the air permeability within the above-mentioned range, the filter material of the present invention must have a basis weight of 3 to 30 g/g, as pointed out hereinbefore.

When a composite sheet material as mentioned above is used as the coffee filter material in the present invention, the supporting layer is laminated and combined with the fibrous filter layer according to an appropriate method. For this lamination, there can be adopted, for example, a bonding method using an innoxious adhesive, a heat fusion bonding method and a mechanical entanglement method. When the heat fusion bonding method is adopted, the supporting layer can be locally fusion-bonded to the fibrous filter layer through at least one fusion bonding area. In this fusion bonding area, a portion of the fibers in one of the supporting layer and the fibrous filter layer is fusion-bonded to the other layer, whereby both the layers are bonded to each other. Furthermore, the fibrous filter layer can have at least one fiber-fusion-bonded area. In this fiber-fusion-bonded area, a portion of the integrated and interlaced organic synthetic fibers is fusion-bonded to the other portion of the organic synthetic fibers in the fibrous filter layer, whereby movement or falling of the organic synthetic fibers during the extraction of coffee is prevented, the dimensional change of fibrous filter layer, such as contraction or elongation, is prevented, and the filtering characteristics of the coffee filter material of the present invention can be kept uniform.

The numbers, shapes and distribution states of the fusion bonding area between the two layers and the fiber-fusion-bonded area of the fibrous filter layer are not particularly critical, and can be appropriately set, as long as the intended project of the present invention can be attained.

The coffee filter material of the present invention can be formed into an optional shape or dimension according to the intended use and the extraction conditions. For example, the coffee filter material can take any of the forms of an extraction sheet, an extraction bag, an extraction cylinder, and an extraction funnel.

When a coffee filter sheet or a coffee filter bag is prepared from the coffee filter material of the present invention comprising the fibrous filter layer and the supporting layer, the fibrous filter layer may be disposed either on the filtration primary side (coffee powder side) or the filtration secondary side (coffee extract side). If the fibrous filter layer is arranged on the filtration primary side, the filtering pores are clogged by the coffee fine particles, and the coffee particles are appropriately steam-aged on the filtration primary side. In the case of a coffee filter bag, if the supporting layer is arranged on the filtration secondary side, the permeation of hot water into the bag is accelerated and the extraction operation is promoted. Furthermore, the fibrous filter layer arranged on the filtration primary side shows an appropriate effect of adsorbing and capturing the oil and fat component in the extract, whereby a degradation of the appearance of the surface of the coffee extract by a rising of the oil and fat component can be prevented, and an appropriate taste and flavor can be given to the coffee extract.

The coffee filter bag obtained by the filter material of the present invention comprises a bag-shaped member formed from a coffee filter material of the present invention as set forth above, which comprises confronting front and back surface portions and a closed peripheral portion thereof, a coffee powder contained in the bag-shaped member, a banging member fixed to the bag-shaped member on at least one end portion thereof, and at least one fiber-fused area formed on each of the front and back surface portions.

Each of the front and back surface portions of this filter bag may be formed solely of the above-mentioned fibrous filter layer composed of the filter nonwoven fabric, or may be formed of the composite sheet material obtained by laminating and combining the above-mentioned fibrous filter layer with a reinforcing fabric.

The structure of the coffee filter bag will now be described with reference to the accompanying drawings.

Figure 4:
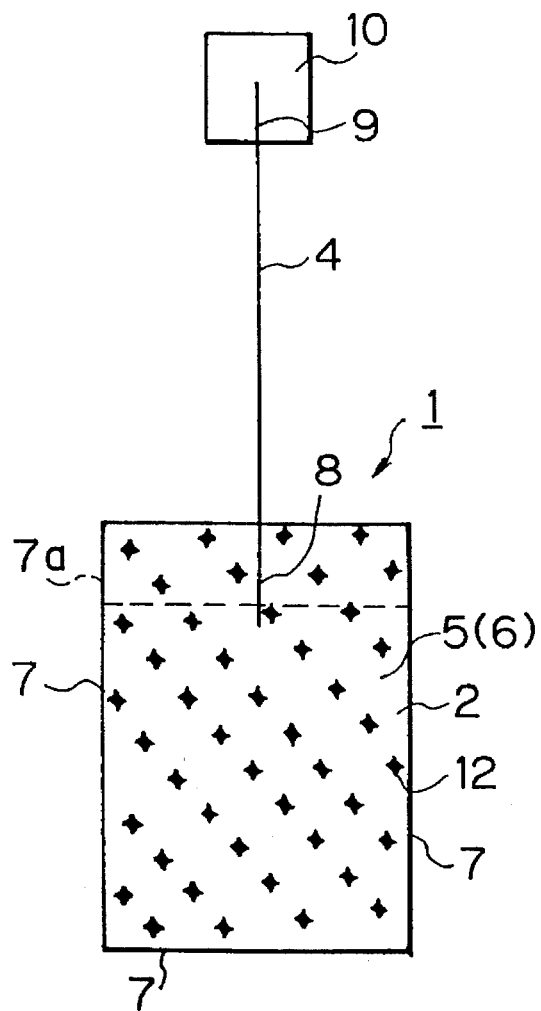
FIG. 4 is a front view illustration embodiment of the coffee filter bag of the present invention.
Figure 5:
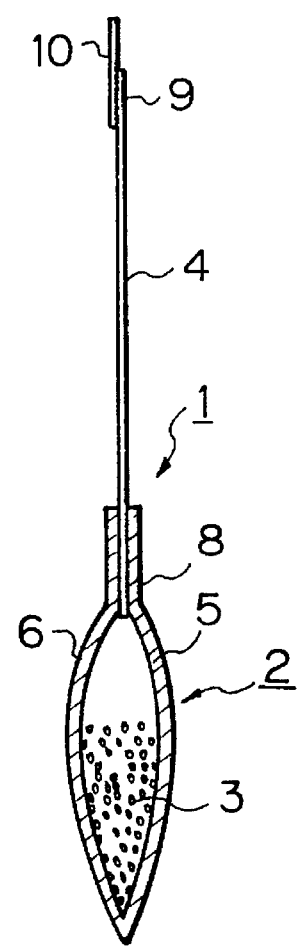
FIG. 5 is an explanatory cross-sectional side view illustrating the coffee filter bag shown in FIG. 4.

Referring to FIGS. 4 and 5, the extraction bag 1 of the present invention comprises a bag-shaped member 2, a coffee powder 3 contained in the bag-shaped member 2, and a hanging member 4.

The bag-shaped member 2 has confronting front and back surface portions 5 and 6 and a closed peripheral portion 7 thereof, and especially, the top end portion of the bag-shaped member 2 is closed at a part 7a indicated by a dotted line in FIG. 4, after the coffee powder 3 has been filled. Of course, the position and mode of this top end closed part are not limited to those shown in FIG. 4.

The size of the bag-shaped member is not particularly critical, but preferably the length of the bag-shaped member is 7 to 10 cm, and the width of the bag-shaped member is 4 to 8 cm, to provide a sufficient 10 amount of coffee for one person.

In the embodiment shown in FIGS. 4 and 5, the hanging member 4 consists of a thread or a cord, and is bonded at a lower end portion 8 thereof to the bag-shaped member 2 and the remaining portion extends beyond the bag-shaped member. The lower end portion 9 of the hanging member 4 can be fixed to a gripping piece 10, and the gripping piece has an optional shape or size and is formed of a paper or plastic sheet. In another embodiment of the hanging member, for example, both end portions are fixed to the bag-shaped member and the remaining portion extends over the bag-shaped member in the form of a loop.

The type and particle size of coffee powder contained in the bag-shaped member are not particularly critical, but roasted, medium ground powder is generally preferably used. Preferably the pulverization degree is such that particles having a size of 18 to 35 mesh occupy at least 50% of the total particles and more preferably, particles having a particle size of 22 to 30 mesh occupy at least 65% of the total particles.

In the bag-shaped member of the coffee filter bag of the present invention, at least one fiber-fused area is formed on each of the front and back surface portions.

Figure 6:
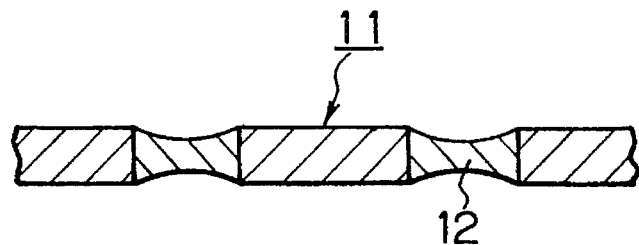
FIG. 6 is an explanatory cross-sectional view illustrating an embodiment of the nonwoven fabric for the fibrous filter layer, which is usable for the present invention.
Figure 7:
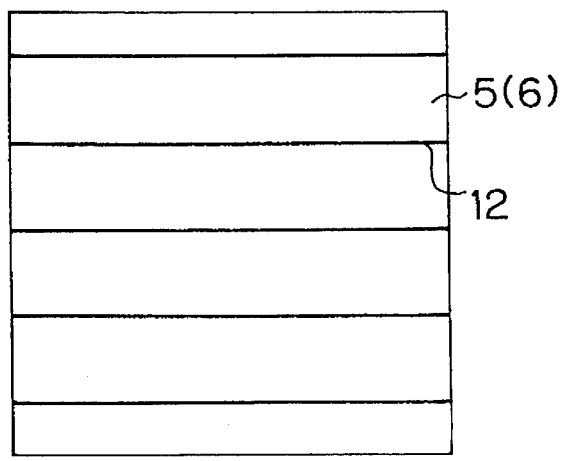
FIGS. 7 to 10 are respectively an explanatory diagram showing an example of the shape and arrangement of fiber fuse-bonded areas formed in the front and back surface portions of the bag-shaped member usable for the coffee filter bag of the present invention; and, FIG. 11 is an explanatory sectional view illustrating another embodiment of the nonwoven fabric for the fibrous filter layer, which is usable for the present invention.
Figure 8:
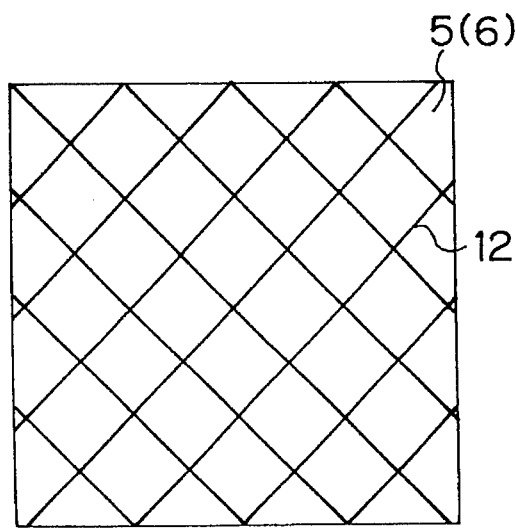
Figure 9:
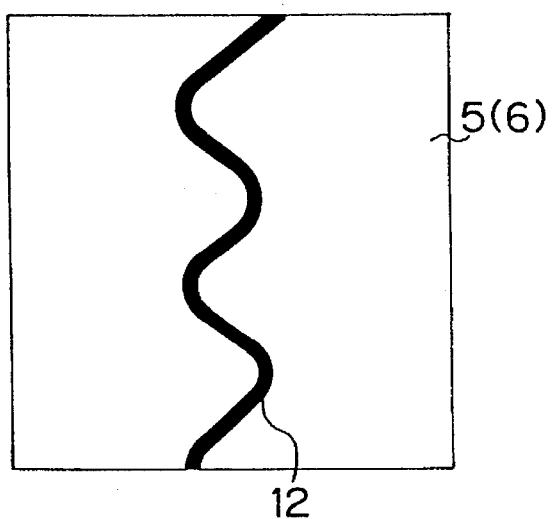
Figure 10:
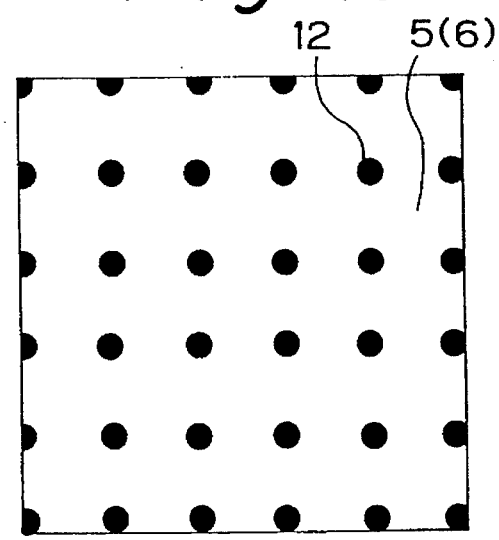

Referring to FIG. 6 illustrating a cross-section of a nonwoven fabric constituting the front and back surface portions of the bag-shaped member, at least one fiber-fuse-bonded area 12 is formed in the nonwoven fabric 11. Namely, a portion of the organic synthetic fibers integrated and interlaced in the nonwoven fabric is fuse-bonded to other portions of the fibers in the fiber fused-bonded area. Accordingly, movement or falling of the fibers, or contraction, elongation or other dimensional change of the nonwoven fabric, caused in hot water or during the extraction operation, can be controlled, and therefore, an uneven extraction or leaking of coffee powder can be prevented. Simultaneously, the strength of the bag-shaped member can be enhanced.

Furthermore, since this fiber fuse-bonded area can be made transparent, the extraction state in the coffee filter bag can be observed through this transparent area.

The number and shape of the fiber fuse-bonded areas formed on the front and back surface portions are not particularly critical, so far as the above-mentioned effects can be attained. For example, as shown in FIG. 4, many square fiber fuse-bonded areas can be regularly arranged at predetermined intervals. The fiber fuse-bonded area can have an optional shape, for example, a circular, elliptic, triangular or hexagonal shape. The dimension and arrangement can be appropriately changed. Furthermore, the fiber fuse-bonded areas can have such shapes and be arranged in the manners as shown in FIGS. 7 through 10, and other optional shapes and arrangement manners can be adopted.

In each of the front and back surface portions of the bag-shaped member of the present invention, the ratio of the total area of the fiber fuse-bonded areas to the entire surface area is preferably at least 5%, more preferably 5 to 40%, still more preferably 6 to 30%.

Where a plurality of fiber fuse-bonded areas independent from one another are formed in the front or back surface portion, the area of each fiber fuse-bonded area is preferably at least 0.05 mm$^2$, more preferably 0.05 to 3 mm$^2$ (for example, 0.25 mm$^2$). Where the fiber fuse-bonded area has a linear shape, preferably the width of the fiber fuse-bonded area is at least 0.2 mm, more preferably about 0.2 to about 3 mm.

In accordance with another embodiment of the coffee filter bag of the present invention, each of the front and back surface portions is formed of a composite sheet material comprising a laminate of a fibrous filter layer and a supporting layer.

Figure 11:
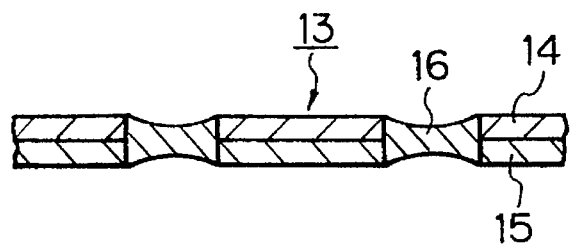

Referring to FIG. 11, the composite sheet material 13 usable for the present invention is a laminate of one nonwoven fabric layer 14 for the fibrous filter layer and a nonwoven fabric layer 15 for the supporting layer, and both the nonwoven fabric layers 14 and 15 are bonded together by fiber fuse-bonded areas 16. The functional effect and mode of the fiber fuse-bonded area 16 are as mentioned above. If the fibrous filter layer and supporting layer are laminated and bonded together by the fiber fuse-bonded areas, the filtering effect is increased, the mechanical strength is increased and the clarity of the extract is improved.

The composite sheet material optionally comprises one or two sheets of the nonwoven fabric for the fibrous filter layer interposed between two sheets of the nonwoven fabric for the support layer, or one or two sheets of the nonwoven fabric for the support layer interposed between two sheets of the nonwoven fabric for the fibrous filter layer. Furthermore, the composite sheet material optionally comprises two sheets of the nonwoven fabric for the support layer and two sheets of the nonwoven fabric for the fibrous filter layer, laminated alternately or in other optional order.

In each case, the total basis weight of the composite sheet material is preferably 20 to 30 g/m$^2$, and the total thickness is preferably 0.1 to 0.2 mm.

For the production of the coffee filter bag of the present invention, the nonwoven fabric for the fibrous filter layer or the composite sheet material comprising the nonwoven fabric for the fibrous filter layer and the nonwoven fabric for the supporting layer is partially heated according to a predetermined pattern to form fiber fuse bonded areas. At this treatment, the fiber fuse-bonded areas can be made substantially transparent by controlling the degrees of heating and compression. The nonwoven fabric or composite sheet material having fiber fuse-bonded areas is cut into a predetermined size and formed into a bag-shaped member having a predetermined shape and one opening. A predetermined quantity of coffee is filled into the bag-shaped member through the opening, and then the opening is closed. At an optional step in the above-mentioned process, the hanging member is attached to the bag-shaped member.

When extraction is carried out by using the coffee filter bag of the present invention, the filter bag is put into a vessel (cup) and hot water is poured into the vessel, and the bag is swung in the cup by manipulating the hanging member, whereby a clear extract can be obtained within a short time.

The coffee filter material of the present invention was especially valuable as a coffee filter bag or a drip type coffee filter sheet, and this coffee filter material allows appropriate permeation of coffee fine particles and can adsorb and capture an oil and fat component appropriately. Accordingly, the filter material makes it possible to prepare a high-quality coffee extract in a short time by a simple operation.

Furthermore, the coffee filter bag of the present invention comprises a bag-shaped member having front and back surface portions composed of the above-mentioned coffee filter material, and therefore, the coffee filter bag has a very high filtering effect, prevents a leakage of solid particles, and can adsorb and remove an extracted oil and fat component from the coffee extract. Moreover, since fiber fuse-bonded areas are formed in the front and back surface portions, dislocation or falling of the fibers in the filter material is prevented and the mechanical strength thereof is maintained at a high level.

Still further, by making the fiber fuse-bonded areas substantially transparent, it becomes possible to observe the extraction state in the bag and confirm the degree of the extraction.

Accordingly, by using the coffee filter bag of the present invention, a clear extract, free of an oil and fat component and solid fine powder, can be obtained in a short time at a high extraction efficiency from coffee in the bag.

EXAMPLES

The present invention will now be described in detail with reference to the following examples.

In the examples, the fine pore distribution in the nonwoven fabric and the adsorption of the coffee oil and fat component were determined by methods described below.

Method of Measuring Fine Pore Distribution

According to the mercury penetration method, mercury was forced into a specimen consisting of a nonwoven fabric, the amount of mercury penetrated into the specimen was measured while changing the forcing pressure in the range of 0.4 to 10,000 psi, and the pore distribution curve and the pore volume y (cm$^3$/g) were determined from the resultant data. The cumulative value of the pore volumes was calculated in order from the small pore radius side, and the maximum pore radius $r_{30}$ (μm), $r_{50}$ (μm) or $r_{70}$ (μm) corresponding to the cumulative pore volume value reached 0.3y, 0.5y or 0.7y was determined. Note, the contact angle and surface tension of mercury were regarded as 130° and 484 dyne/cm, respectively.

Method of Measuring Oil and Fat Component Adsorption

A nonwoven fabric specimen having an area of 100 cm$^2$ (10 cm×10 cm) was attached to a stainless steel wire net and was obliquely fixed inside of a beaker having an inner volume of 1000 ml. The beaker was charged with a mixture of 400 ml of distilled water and 1.0 g of an oil and fat component extracted from coffee and the mixture in the beaker was heated on an electric heater to boil. Upon boiling, the oil and fat component on the surface of the mixtures circulated in the form of fine particles by convection and brought into contact with the nonwoven fabric specimen, whereby the fine particles of the oil and fat component were adsorbed on the nonwoven fabric specimen. This operation was carried out for 5 minutes to completely absorb the oil and fat component of coffee on the nonwoven fabric specimen. The nonwoven fabric specimen was taken out of the beaker and placed in an Erlenmeyer flask having an inner volume of 300 ml, and 100 ml of diethyl ether was added into the flask and the adsorbed oil and fat component was extracted in an ultrasonic washing device. The nonwoven fabric specimen was taken out of the flask and washed with diethyl ether. The diethyl ether fraction was dried with anhydrous sodium sulfate and then further dried under a reduced pressure. The isolated oil and fat component was weighed. The purity of the recovered oil and fat component was determined by comparing chromatograms obtained by using a column (Lichrsolb Si-60) having a diameter of 4.0 mm and a length of 25 cm.

The oil and fat component extracted from coffee, used at this experiment, was obtained by adding 1000 ml of diethyl ether to 150 g of medium-ground coffee powder, carrying out extraction for 2 hours, filtering the extract with a filter paper, removing the solvent by distillation under reduced pressure and purifying the residue by the silica gel chromatography using a mixed solvent consisting of ethyl ether and hexane in a mixing ratio of 2/8 by weight.

Example 1 and Comparative Example 1

In Example 1, a nonwoven fabric (consisting of split fibers) for the fibrous filter layer, composed of polypropylene ultra-fine fibers having an average diameter of about 15 μm, was laminated with a nonwoven fabric for the supporting layer, composed of a fuse-bondable fibers comprising, as a main component a polyethylene resin, and both layers were partially fuse-bonded to each other to form a two-layer composite sheet.

The polypropylene fiber nonwoven fabric for the fibrous filter layer had the following properties.

Basis weight x: 18 g/m$^2$

Cumulative pore volume y: 6.8 cm$^3$/g $r_{30}$: 9 μm $r_{50}$: 18 μm $r_{70}$: 35 μm Oil and fat component adsorption: 2.75 g/g The air permeability of the composite sheet was about 200 cm$^3$/cm$^2$.sec.

A bag-shaped member for a coffee bag was prepared by using this composite sheet. The maximum size of fine particles in the fraction on the small particle side, which fraction occupied 50% of the total volume of coffee particles permeated through this filter bag, was about 10 μm.

The bag-shaped member was filled with 8 g of finely ground roasted coffee powder and the bag-shaped member was sealed to provide a coffee bag. A vessel was charged with the coffee bag and 150 ml of hot water at 95° C. The bag was shaken in hot water for 90 seconds. When the obtained coffee extract was observed, it was found that a precipitation of fine particles or floating of the oil and fat component did not occur, and the coffee extract had an appropriate concentration and flavor, and a high quality.

In Comparative Example 1, a nonwoven fabric composed of polypropylene fibers having an average diameter of 30 μm was prepared. This PP nonwoven fabric had an air permeability of 270 cm$^3$/cm$^2$.sec.

The properties of this PP nonwoven fabric were as follows.

x: 20 g/m$^2$ y: 4.5 cm$^3$/g $r_{30}$: 45 μm $r_{50}$: 58 μm $r_{70}$: 93 μm

Oil and fat component adsorption: 1.35 g/g

A coffee bag was prepared in the same manner as described in Example 1, and a coffee extract was prepared by using this coffee bag. The coffee extract had a concentration similar to that of the coffee extract obtained in Example 1, but it was observed that the oil and fat component floated on the liquid surface, a large amount of precipitated fine particles were found on the bottom of the vessel, and thus the resultant coffee extract had a low quality. The amount of the precipitated fine particles was 350 mg and the particle size was distributed over a broad range of from 50 to 100 μm.

Examples 2 through 4 and Comparative Examples 2 through 4

In Examples 2 to 4 and Comparative Examples 2 to 4, coffee filter bags were prepared by using coffee filter materials composed of nonwoven fabrics for the fibrous filter layer and nonwoven fabrics for the supporting layer, shown in Table 1. These coffee filter bags were compared with one another with respect to the coffee extracting performances thereof, in the following manner.

Namely, 6 g of medium-ground coffee powder was filled in a bag-shaped member of 5 cm×7 cm made from the filter material as shown in Table 1, and the bag-shaped member was sealed and a hanging string was attached to the bag-shaped member to form a coffee filter bag. A beaker having an inner volume of 200 ml was charged with the coffee bag, and about 15 ml of hot water at 95° C. was poured into the beaker. The content in the beaker was steamed for 40 seconds, and then about 135 ml of hot water at 95° C. was further poured into the beaker (the total amount of hot water became 150 ml) and the coffee bag was allowed to stand in the hot water for 50 seconds. The bag was vertically moved 15 times by using the hanging string, to extract the coffee. The bag was then taken out of the beaker, and the obtained coffee extract was evaluated with respect to the following items.

Extract Concentration:

A coffee extract was filtered through a membrane filter having an average pore size of 0.45 μm to remove fine particles from the coffee extract and the coffee concentration of the filtrate was determined by measuring the absorbance of the filtrate at a wavelength of 750 nm by using a spectrophotometer. A larger measured value indicates a higher concentration.

Transparency:

With respect to a coffee extract and a filtrate obtained by filtering this coffee extract by a membrane filter having an average pore size of 0.45 μm to remove fine particles of coffee, the absorbance (%) at a wavelength of 750 nm was measured by a spectrophotometer. The difference between the absorbances of both liquids was determined, and the transparency of the coffee extract was expressed by this difference. The larger the value of the difference, the larger the amount of floating fine particles, and the lower the transparency.

Precipitate:

A beaker charged with 150 ml of a coffee extract was allowed to stand for 5 minutes, and the dry weight (mg) of fine powder precipitated in the bottom was measured.

Floating Oil and Fat:

The spread of the oil and fat component floating on the surface was organoleptically evaluated. The specimen in which the oil and fat component was not substantially observed was evaluated as class 5, and the specimen in which the oil and fat component was floating over almost the entire liquid surface was evaluated as class 1. The degree of spread of the floating oil and fat component was evaluated in five classes based on these standard values.

The results of these tests are shown in Table 1.

TABLE 1

| Example No. | Nonwoven Fabric for Fibrous Filter Layer | | | | | | Oil and Fat Component Adsorption (g/g) | Nonwoven Fabric for Supporting Layer | Quality of Coffee Extract | | | |
|---|---|---|---|---|---|---|---|---|---|---|---|---|
| | Material | Basis Weight (g/m²) | Cumulative Pore Volume (cm³/g) | $r_{30}$ (μm) | $r_{50}$ (μm) | $r_{70}$ (μm) | | | Extract Concentration (%) | Transparency (%) | Precipitate (mg) | Floating Oil and Fat (class) |
| Example 2 | PPMB | 5 | 8.6 | 7 | 10 | 30 | 3.50 | (a) | 17 | 30 | 1.8 | 5 |
| Example 3 | PPMB | 13 | 8.9 | 6.7 | 9.6 | 24 | 3.75 | (b) | 16 | 22 | 0.5 | 5 |
| Example 4 | NyMB | 10 | 9.0 | 12 | 16 | 40 | 1.63 | (c) | 17 | 38 | 2.0 | 4 |
| Comparative Example 2 | NySB | 20 | 4.3 | 25 | 38 | 61 | 0.65 | not used | 14 | 72 | 86 | 3 |
| Comparative Example 3 | PPSB | 20 | 6.9 | 43 | 54 | 82 | 1.50 | not used | 17 | 80 | 124 | 3 |
| Comparative Example 4 | Pu/R/PP | 18 | 2.1 | 15 | 26 | 58 | 0.18 | not used | 16 | 46 | 17 | 2 |

Note:
Material
 PPMB: polypropylene melt-blow nonwoven fabric
 NyMB: nylon melt-blow nonwoven fabric
 PPSB: polypropylene spun-bond nonwoven fabric
 NySB: nylon spun-bond nonwoven fabric
 Pu/R/PP: pulp/rayon/polypropylene heat-bonded nonwoven fabric
Supporting Layer
 (a): polypropylene spun-bond nonwoven fabric
 (b): polyethylene heat-fusion-bonded nonwoven fabric
 (c): nylon spun-bond nonwoven fabric Example 5 and Comparative Example 5

In Example 5, a nonwoven fabric for the fibrous filter layer was prepared from polypropylene fibers formed by a melt-blow process, which fibers had an average diameter of 5 μm, and a nonwoven fabric for the supporting layer, which was composed mainly of polyethylene fibers, was laminated on the above-mentioned nonwoven fabric for the fibrous filter layer. Both the nonwoven fabrics were partially fuse-bonded to each other to form a composite sheet material.

The properties of the monowoven fabric for the fibrous filter layer were as follows.
x: 20 g/m²
y: 7.3 cm³/g
$r_{30}$: 9 μm
$r_{50}$: 15 μm
$r_{70}$: 30 μm
Oil and fat component adsorption: 4.1 g/g The air permeability of the composite sheet material was about 40 cm³/cm².sec. From this composite sheet material was formed a drip type coffee filter (in the form of bag having one end opened). Roasted coffee beans were ground, and without screening the resultant particles, 15 g of the ground coffee powder were filled in the coffee filter bag. Then, 150 ml of distilled water maintained at a temperature of 90° C. was poured into the coffee filter bag from the upper open end, and the coffee powder was extracted and filtered. The time required for the extraction and filtration was about 90 seconds.

Then, 100 g of the resultant coffee extract was sampled, water was removed from the collected sample by evaporation, and the weight of the residual solid was measured. It was found that the weight of the residual solid was 2151 mg. When the particle size of coffee fine particles in the coffee extract and the volume thereof were measured by a particle size distribution-measuring machine (Model SAL D-1000 supplied by Shimazu Seisakusho), it was found that the maximum size of fine particles in the small particle size side fraction which occupied 50% of the total volume of the permeated coffee particles, was about 7 μm. The resultant coffee extract had an appropriate transparency and a high quality characterized by a good flavor and taste.

In Comparative Example 5, the same procedures as in Example 5 were repeated except that a coffee drip pulp paper was used as the filter.

The properties of this pulp paper were as follows.
x: 60 g/m²
y: 2.1 cm³/g
$r_{30}$: 8 μm
$r_{50}$: 15 μm
$r_{70}$: 57 μm Oil and fat component adsorption: 0.08 g/g The air permeability of this filter was 7 cm³/cm².g, and the required extraction and filtration time was 180 seconds. The weight of the solid in the resultant coffee extract was 1.86 g. The maximum size of fine particles in the small particle size side fraction which occupied 50% of the total volume of the coffee fine particles permeated through the filter, was about 4 μm. Compared with the coffee extract obtained in Example 5, this comparative coffee extract had a thin tint and an inferior quality such as flavor and taste.

We claim:

1. A coffee filter bag formed from a coffee filter material having a fibrous filter layer comprising a filter nonwoven fabric having pores, said pores varying in volume in accordance with the radius of the pores, said fabric being composed of melt blown polypropylene fibers having an average diameter of 15 μm or less, wherein the filter nonwoven fabric satisfies the relationships (1) to (4):

$3 \leq x \leq 30$ (1), $y \geq 0.2x$ (2), $3 \leq r_{30}$ (3), and $r_{70} \leq 40$ (4)

wherein x represents a basis weight (g/m²) of the filter nonwoven fabric, y represents a cumulative volume value (cm³/g) of said pores in the filter nonwoven fabric, determined by a mercury porosimeter in which mercury is forced into the filter nonwoven fabric and the amount of mercury penetrated into the fabric is measured while changing the forcing pressure of mercury in the range of 0.4 to 10,000 PSI, $r_{30}$ represents a maximum radius (μm) of the pores observed when the volume of the pores in the filter nonwoven fabric are cumulated by said porosimeter starting with the volumes of said pores having a smallest radius and the cumulative volume value becomes equal to 0.3y, and $r_{70}$ represents a maximum radius (μm) of the pores observed when the volumes of the pores in the filter nonwoven fabric are cumulated by said porosimeter starting with the volume of said pores having a smallest radius and the cumulative volume becomes equal to 0.7y, and is capable of removing from a mixture of 400 ml of distilled water and 1.0 gram of an oil and fat component extracted from coffee at least 0.5 gram of said oil and fat component per gram of fiber when the filter nonwoven fabric having an area of 100 cm² is boiled for 5 minutes in said mixture and a supporting layer comprising at least one sheet of a reinforcing fabric having no substantial influence on the filtering property of the fibrous filter layer and laminated and combined with the fibrous filter layer to form an integrated composite sheet material.

2. A coffee filter material as claimed in claim 1, wherein $r_{50}$ is said maximum radius (mm) of the pores observed when the volumes of the pores in the filter nonwoven fabric are cumulated by said porisometer in which mercury is forced into the filter nonwoven fabric and the amount of mercury penetrated into the fabric is measured while changing the forcing pressure of mercury in the range of 0.4 to 10,000 PSI starting with the volumes of said pores having a smallest radius and the cumulated volume value becomes equal to 0.5y, and $r_{50}$ satisfies the relationship $3 < r_{50} < 40$.

3. A coffee filter bag as claimed in claim 1 wherein said melt blown polypropylene fibers have a diameter of 5 μm or less.

4. A method of extracting coffee comprising placing a coffee filter bag containing a coffee powder in a cup, and pouring hot water onto the coffee filter bag, in which the coffee filter bag is formed from a coffee filter material having a fibrous filter layer comprising a filter nonwoven fabric having pores, said pores varying in volume in accordance with the radius thereof, said fabric being composed of melt blown polypropylene fibers having an average diameter of 15 μm or less, wherein the filter nonwoven fabric satisfies the relationships (1) to (4):

$3 \leq x \leq 30$ (1), $y \geq 0.2x$ (2), $3 \leq r_{30}$ (3), and $r_{70} 40$ (4)

wherein x represents a basis weight (g/m²) of the filter nonwoven fabric, y represents a cumulative volume value (cm³/gl of said pores in the filter nonwoven fabric, determined by a mercury porosimeter in which mercury is forced into the filter nonwoven fabric and the amount of mercury penetrated into the fabric is measured while changing the forcing pressure of mercury in the range of 0.4 to 10,000 PSI, $r_{30}$ represents a maximum radius (μm) of the pores in the filter nonwoven fabric are cumulated by said porosimeter starting with the volumes of said pores having a smallest radius and the cumulative volume value becomes equal to 0.3y, and, $r_{70}$ represents a maximum radius (μm) of the pores observed when the volumes of the pores in the filter nonwoven fabric are cumulated by said porosimeter starting with the volume of said pores having a smallest radius and the cumulative volume value becomes equal to 0.7, and is capable of removing from a mixture of 400 ml of distilled water and 1.0 gram of an oil and fat component extracted from coffee at least 0.5 gram of said oil and fat component per gram of fiber when the filter nonwoven fabric having an area of 100 cm$^2$ is boiled for 5 minutes in said mixture.

5. The coffee-extracting method as claimed in claim 4, wherein, $r_{50}$ is said maximum radius (μm) of the pores observed when the volumes of the pores in the filter nonwoven fabric are cumulated by said porosimeter starting with the volumes of said pores having the smallest radius and the cumulative volume value becomes equal to 0.5y, and $r_{50}$ satisfies the relationship $5 \leq r_{50} \leq 30$.

6. The coffee-extracting method as claimed in claim 4, wherein said melt blown polypropylene fibers have a diameter of 5 μm or less.

* * * * *

UNITED STATES PATENT AND TRADEMARK OFFICE
CERTIFICATE OF CORRECTION

PATENT NO. : 5,496,573
DATED : March 5, 1996
INVENTOR(S) : Tsuji et al

It is certified that error appears in the above-indentified patent and that said Letters Patent is hereby corrected as shown below:

Column 16, line 51, claim 4, formula 4, change "$r_{70} 40$" to --$r_{70} \leq 40$--

Signed and Sealed this

First Day of October, 1996

Attest:

BRUCE LEHMAN

Attesting Officer

Commissioner of Patents and Trademarks